Oct. 4, 1955  M. E. CLEM  2,719,339
AUTOMOBILE WINDSHIELD CLEANER
Filed Feb. 25, 1953  2 Sheets-Sheet 1

INVENTOR.
MARION E. CLEM,
BY
McMorrow, Berman & Davidson
ATTORNEYS.

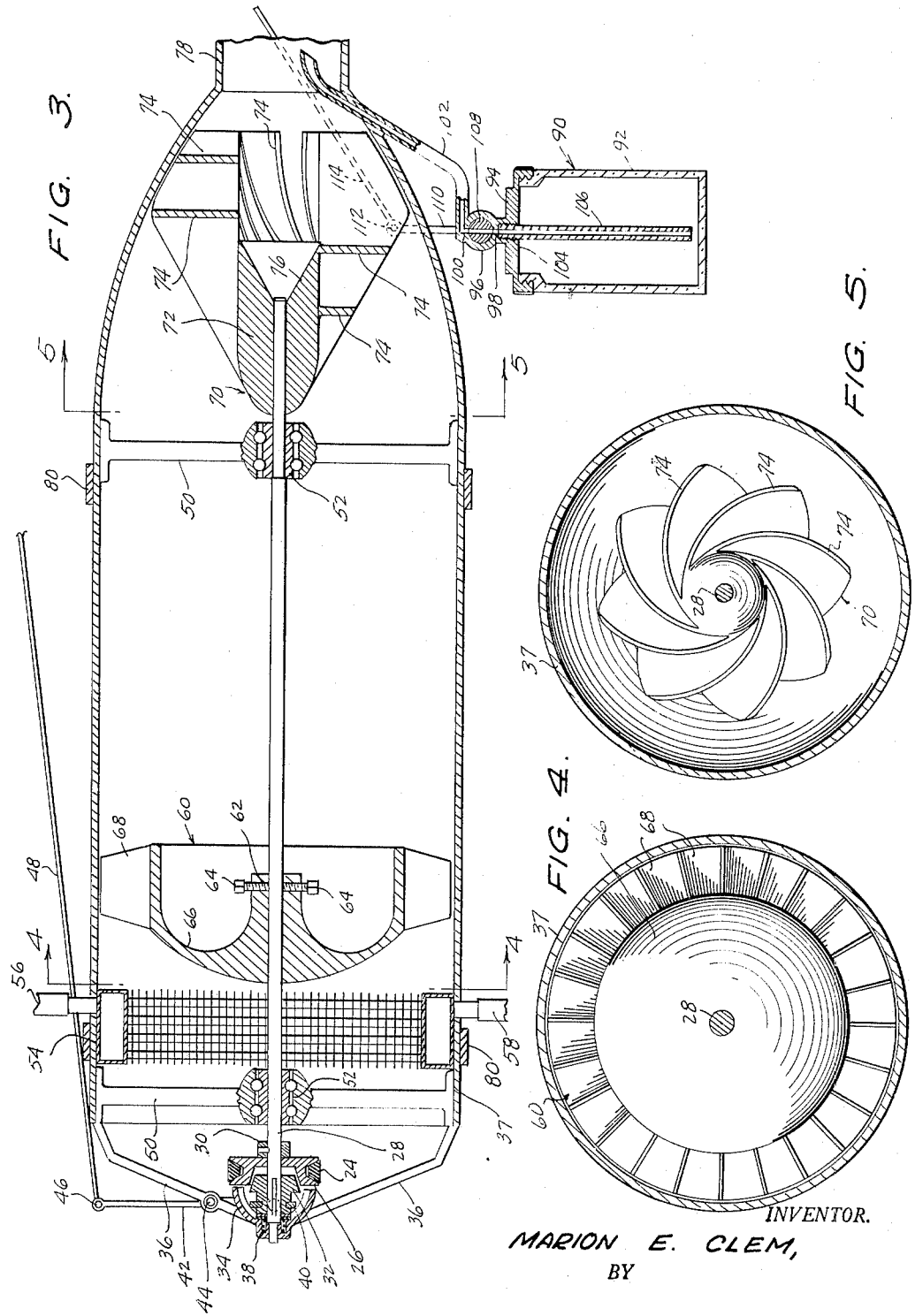

United States Patent Office 2,719,339
Patented Oct. 4, 1955

2,719,339

AUTOMOBILE WINDSHIELD CLEANER

Marion E. Clem, Chicago, Ill.

Application February 25, 1953, Serial No. 338,864

2 Claims. (Cl. 20—40.5)

This invention relates to a device adapted to be mounted on an automobile or truck, and designed to direct either air of a cleaning liquid against a windshield, for the purpose of maintaining clear visibility therethrough. The invention is also adapted for incorporation of a heating unit therein, whereby to direct heated air against the windshield, if desired, for defrosting purposes. Further, the device is adapted, when it is raining, to keep the windshield dry at all speeds.

It is well appreciated among drivers that when, for example, one is driving in a severe snow storm, the windshield wipers are often inadequate in respect to their ability to remove snow and ice lodging against the windshield. In many instances, the conventional defroster assembly, used to direct warm air against the inner surface of the windshield, does not provide sufficient aid to the windshield wipers under severe weather conditions.

Accordingly, one important object of the present invention is to provide an improved windshield cleaner adapted to be powered from the vehicle engine under the control of an operator located within the passenger compartment of the vehicle, which cleaner will cause a wide stream of air to be directed upwardly over the outer windshield surface at high velocity, so as to overcome effectively the opposing air current directed against the windshield while the vehicle is in movement, said opposing air current normally tending to lodge an excessive quantity of snow and ice on the windshield.

Another object of importance is to provide a device as stated wherein, at the option of the vehicle operator, a liquid cleaner will be sucked through a nozzle into the high velocity air stream, so as to be broken into small particles of liquid and sprayed over the windshield.

Another object of importance is to provide a device as described which can be mounted upon a vehicle as an accessory, without involving substantial modification or redesign of said vehicle.

A further object of importance is to provide, in a structure of the type stated, a novelly designed blower casing in which a plurality of blowers or fans of different types will be mounted, which fans will be so formed and arranged relative to one another and to the casing as to provide particularly beneficial results in respect to increasing the velocity of the air directed against the windshield.

Other objects will appear from the following description, the claims appended thereto, and from the annexed drawings, in which like refernce characters designate like parts throughout the several views, and wherein:

Figure 3 is an enlarged longitudinal sectional view through the device per se, taken substantially on line 3—3 of Figure 1;

Figure 4 is a transverse sectional view on line 4—4 of Figure 3; and

Figure 5 is a transverse sectional view substantially on line 5—5 of Figure 3.

Figure 1:
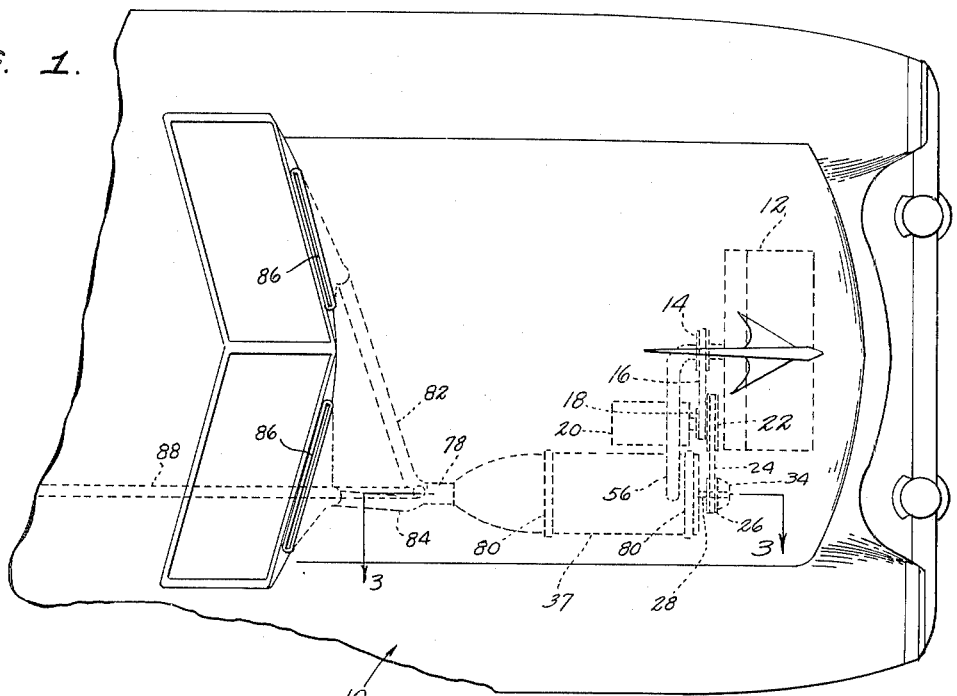
Figure 1 is a fragmentary top plan view of an automobile equipped with the cleaning device constituting the present invention, said cleaning device being illustrated in dotted outline.
Figure 2:
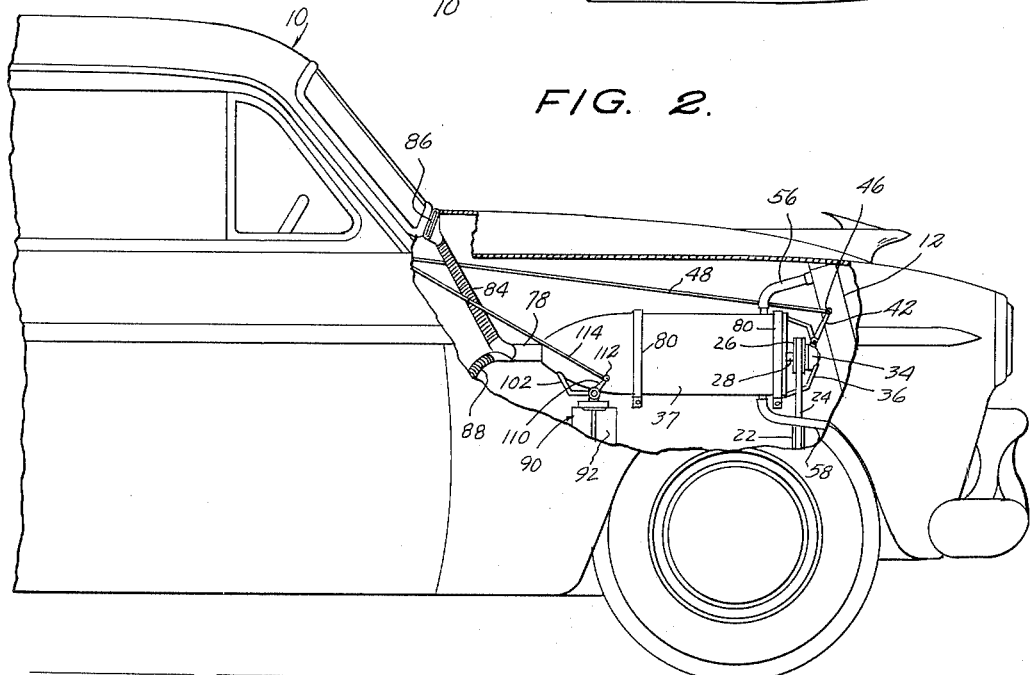
Figure 2 is a fragmentary side elevational view of the automobile, portions being broken away to show the cleaning device in side elevation.

A conventional automobile or similar vehicle has been generally designated by the reference numeral 10, and is provided with the usual radiator 12, crank shaft pulley 14, belt 16 trained about said pulley and about the generator pulley 18, and generator 20.

Power for the invention is adapted to be taken off the generator shaft, and accordingly, there is secured to said generator shaft a drive pulley 22 which, because of its enlarged diameter, constitutes a step-up pulley for increasing rotary speed. At this point, it may be noted that the pulley 22 need not necessarily be mounted upon the generator shaft, but could also be mounted upon the water pump shaft, in some instances.

Trained about, and driven from, the pulley 22 is a belt 24, said belt 24 driving the driven pulley 26. Pulley 26 is substantially smaller in diameter than the pulley 22.

It will be understood that although no diameters are specified herein, these will be predetermined in a commercial embodiment of the invention, so as to cause a step-up in speed of a blower shaft 28 to be rotated by pulley 26, over the speed of the crank shaft of the vehicle. High speed rotation of the blowers carried by shaft 28 will thus be obtained.

As will be noted from Figure 3, the driven pulley 26 is sleeved upon blower shaft 28, so as to be rotatable relative thereto when the device is not in operation. A stop collar 30 is secured to the shaft 28 by a set screw or the like, and bears against one face of the pulley 26, so as to hold said pulley against movement longitudinally of the shaft in one direction.

A clutch has been designated by the reference numeral 32, and can be, as shown in Figure 3, of the conical type, said clutch being extendable into a complementarily formed clutch-receiving recess formed in the adjacent face of pulley 26. Clutch 32 is splined upon the shaft 28, so as to rotate therewith while still being shiftable longitudinally of the shaft toward and away from the clutch-engaged pulley 26.

Clutch 32 is enclosed within a cup-shaped clutch housing 34 circumposed about one end of shaft 28, and retained in concentric relation to the shaft by radial arms 36 secured at their inner ends to the clutch housing, and fixedly connected at their outer ends to one end of a blower housing or casing 37.

At its center, clutch housing 34 is provided with a roller bearing 38 in which the associated end of shaft 28 is journaled for rotation.

The clutch 32 is shifted longitudinally of the shaft 28 in opposite directions by means of a fork 40, said fork extending through a suitable opening formed in the side wall of the clutch housing 34, and having a lost motion pivotal connection to the lower end of an operating lever 42 pivoted intermediate its ends as at 44 upon one of the clutch housing support arms 36.

At its upper end, the operating lever 42 is pivotally connected at 46 to one end of a flexible steel cable 48, said cable extending to the instrument panel of the vehicle 10, and being there provided with a knob for push-pull operation.

Therefore, when the cable 48 is shifted in one direction, the clutch 32 will be engaged with the pulley 26, and the blower shaft 28 will be rotated at high speed in one direction. When the cable is shifted in an opposite direction, the clutch will be disengaged, and shaft 28 will not be rotated with the constantly rotating pulley 26.

The casing 37 is of cylindrical formation, and is of constant diameter from that end thereof adjacent pulley 26 to a location spaced from the other end of the casing. The casing 37 is then tapered toward said other end.

Fixedly mounted in and spaced longitudinally of the casing 37 are spiders 50, said spiders having at their centers bearings 52 in which the shaft 28 is journaled, said shaft extending longitudinally and centrally of the casing 37, substantially from end to end thereof.

At 54 I have designated an annular, hollow conduit through which warm water can be circulated, said water entering the conduit from an inlet water hose 56 extending from the radiator 12, and leaving the conduit through an outlet hose 58, for return to the radiator. The conduit 54 can be externally configured to improve the heat exchange characteristics of the same, and can be finned if desired. Alternatively, the conduit might be of the core type, having a plurality of individual, separate water passages.

In some commercial embodiments of the invention, the conduit 54 might be omitted, if it is not desired to incorporate a defrosting means in the device. When, however, the conduit is embodied in the invention, air entering the open inlet end of casing 37 and flowing past said conduit will be heated, thereby to obtain a defrosting action when said air is subsequently blown over the windshield surface in a manner to be described hereinafter.

Mounted upon the shaft 28, inwardly of the conduit 54, is an outer fan designated generally by the reference numeral 60, said fan 60 having a hub 62 fixedly mounted upon the shaft 28 at a location selected for optimum results, by means of set screws 64.

Integral with the hub 62 is a concavo-convex body 66, said body being convexed in the direction of the inlet end of casing 37, so as to channel air flowing against the outer fan to the periphery of the fan. At its periphery, the fan 60 is formed with a circumferential series of radially extending blades 68. A substantial number of said blades is preferable, as shown in Figure 4, the blades being preferably pitched at approximately thirty degrees to the axis of rotation of the fan.

The fan 60 serves to draw a substantial quantity of air into the inlet end of the casing, when the shaft 28 is rotated, for movement of said air longitudinally of the casing to a second or inner fan designated generally at 70. Fan 70 is of the compressor type, and includes an elongated, cylindrical hub 72 mounted in the tapered end of the casing, said hub being fixedly secured to the shaft 28 for rotation therewith. Rigid with the hub 72 is a circumferential series of spirally arranged blades 74, the outer edges of said blades being cut away to complement the taper of the casing 37.

In the inner end of the hub 72 a flaring recess is formed, said recess being designated by the reference numeral 76 and being desirable in smoothing the flow of air past the fan 70.

The fan 70 is adapted to change the characteristics of the air flowing thereby, so as to form the same into a high velocity stream that will move at substantial speed into an axial extension 78 of reduced diameter formed upon the tapered end of the casing 37.

The casing can, of course, be mounted upon the vehicle at any desired location found suitable, and will be provided with longitudinally spaced, circumferentially extending mounting bands 80, which bands can be secured to a suitably shaped bracket, not shown, for mounting of the casing upon a structural member of the vehicle.

At its outlet end, the axial extension 78 has diverging branches, to which are connected air hoses 82, 84, leading to flat, flared nozzles 86 the outlet ends of which extend along the lower edge of the automobile windshield panels, exteriorly of the windshield.

A third branch can be formed upon the axial extension 78, so as to direct some of the air into a rear window air hose 88.

It will be seen that when the shaft 28 is rotated under the control of the vehicle operator, air will be forced at high velocity through the nozzles 86, and will flow across substantially full areas of the windshield panels, the speed of the current sending up a force opposing that with which snow or ice particles would be directed against said windshield panels. As a result, the snow and ice particles are caused to veer away from the windshield, thereby to keep the windshield completely clear. Further, the windshield remains dry during a rain.

The invention also includes a liquid-charged windshield cleaner assembly 90. Assembly 90 has incorporated therein a jar 92 in which a suitable liquid cleaner will be contained. The jar or receptacle 92 is exteriorly threaded at its upper end, to engage complementary internal threads formed upon the depending peripheral flange of a container cover 94. Cover 94 has, at its center, an upstanding boss with which is rigid a cylindrical, hollow valve body 96. The valve body 96 has an inlet opening 98 communicating with the interior of the valve body. Diametrically opposite the valve body inlet opening is an outlet opening 100, that also communicates with the interior of said body. Opening 100 extends into a suitable fitting, to which is connected one end of a liquid supply hose 102. Hose 102 extends into the axial extension 78 of casing 37, and has a beveled end located within said axial extension, and opening in the direction in which air will flow through the axial extension.

Below the valve body 96, cover 94 is formed with a threaded opening 104 communicating with inlet opening 98, and engaged in said threaded opening is the upper end of a liquid inlet tube 106. Tube 106 extends downwardly within the container 92, and has its lower terminal spaced a short distance above the bottom of the container.

A cylindrical valve is rotatably mounted in the valve body 96, and has a transverse passage which, in one position of the valve, provides communication between the inlet and outlet openings 98, 100. In another position of the valve, said other position being the closed position thereof, communication between the inlet and outlet openings of the valve body is effectively prevented, to prevent liquid from flowing through the hose 102.

To control the positioning of the valve 108, I provide a valve operating arm 110 fixedly connected at one end to the valve 108. Arm 110 is pivotally connected at 112, at its upper end, to one end of a flexible steel cable 114. Cable 114 extends to the instrument panel of the vehicle, and would there be provided with a knob, for push-pull operation of said cable 114.

When the valve 108 is adjusted to its open position, with air being simultaneously forced at high speed through the axial extension 78, a vacuum will be created at the outlet end of the liquid supply hose 102. As a result, the liquid cleaner will be drawn upwardly through the tube 106, and will be injected into the air stream. The air stream will carry said liquid for discharge thereof at the nozzles 86, and it will be appreciated that the arrangement is one that will cause the liquid to be broken into small particles, so as to be sprayed against the windshield.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. An automobile windshield cleaner comprising a hollow casing having an inlet at one end and an outlet at the other end, a rotatable shaft positioned within and extending longitudinally of said casing, a pair of fans arranged in longitudinal spaced relation along said shaft and each connected to said shaft for rotation therewith, one of said fans being disposed adjacent the inlet end of said casing and of the type to pull air into said casing and the other of said fans being disposed adjacent the outlet of said casing and of the compressor type to force air in a small stream at high velocity out of the casing outlet, an extension extending axially from the outlet of said casing, and a hose carrying a nozzle at one end having the other end connected to said extension.

2. An automobile windshield cleaner comprising a hollow casing having an inlet at one end and an outlet at the other end, a rotatable shaft positioned within and extending longitudinally of said casing, a pair of fans arranged in longitudinal spaced relation along said shaft and each connected to said shaft for rotation therewith, one of said fans being disposed adjacent the inlet end of said casing and of the type to pull air into said casing and the other of said fans being disposed adjacent the outlet of said casing and of the compressor type to force air in a small stream at high velocity out of the casing outlet, an annular conduit disposed within said casing intermediate said one fan and said inlet of said casing, means for circulating warm water through said conduit to thereby heat the air before its introduction into said one fan, an extension extending axially from the outlet of said casing, and a hose carrying a nozzle at one end having the other end connected to said extension.

References Cited in the file of this patent

UNITED STATES PATENTS

| | | |
|---|---|---|
| 1,770,363 | Morgan | July 8, 1930 |
| 1,789,016 | Morgan | Jan. 13, 1931 |
| 1,790,419 | Heinemann et al. | Jan. 27, 1931 |
| 2,180,760 | Mayo | Nov. 21, 1939 |